US012663782B2

(12) United States Patent
McAdam et al.

(10) Patent No.: US 12,663,782 B2
(45) Date of Patent: Jun. 23, 2026

(54) HUMAN MACHINE INTERFACE FOR PROVIDING INFORMATION TO AN OPERATOR OF AN INDUSTRIAL PRODUCTION FACILITY

(71) Applicant: Honeywell International Inc., Charlotte, NC (US)

(72) Inventors: Rohan James McAdam, Walang (AU); Graeme John Laycock, Sidney (AU); Andrew James Lo, Sidney (AU)

(73) Assignee: Honeywell International Inc., Charlotte, NC (US)

( * ) Notice: Subject to any disclaimer, the term of this patent is extended or adjusted under 35 U.S.C. 154(b) by 396 days.

(21) Appl. No.: 18/524,546

(22) Filed: Nov. 30, 2023

(65) Prior Publication Data

US 2024/0411293 A1     Dec. 12, 2024

Related U.S. Application Data

(60) Provisional application No. 63/506,516, filed on Jun. 6, 2023.

(51) Int. Cl.
G05B 19/418          (2006.01)
(52) U.S. Cl.
CPC .................. G05B 19/41835 (2013.01); G05B 2219/31368 (2013.01)

(58) Field of Classification Search
CPC ............ G05B 19/042; G05B 19/41835; G05B 2219/31368; G06F 3/048
See application file for complete search history.

(56) References Cited

U.S. PATENT DOCUMENTS

| | | | |
|---|---|---|---|
| 2017/0357240 A1 | 12/2017 | Stewart et al. | |
| 2021/0373527 A1 | 12/2021 | McAdam et al. | |
| 2021/0398831 A1* | 12/2021 | Oberai ................ | H10P 72/0612 |
| 2022/0067626 A1* | 3/2022 | Unnikrishnan .. | G06Q 10/06375 |
| 2022/0187818 A1* | 6/2022 | Kondejkar ......... | G05B 19/0426 |
| 2022/0318308 A1* | 10/2022 | Dean .................. | G05B 19/4063 |
| 2022/0357723 A1 | 11/2022 | Liu et al. | |

OTHER PUBLICATIONS

Search Report and Written Opinion 24175853.1 dated Nov. 18, 2024.
B.R. Gaines, "Mediator: an Intelligent Information System Supporting the Virtual Manufacturing Enterprise", Oct. 22, 1995.

* cited by examiner

*Primary Examiner* — Omer S Khan
(74) *Attorney, Agent, or Firm* — Paschall & Associates, LLC; James C. Paschall; Anthony Miologos

(57) ABSTRACT

A method and system controlled by a human machine interface (HMI) connected to an industrial process control and automation system controlling an industrial process. The HMI collects information and data from a semantic network in response to a natural language request input into the HMI by an operator. The HMI generates a visual layout for the received information and data that is displayed to the operator using the visual layout.

17 Claims, 6 Drawing Sheets

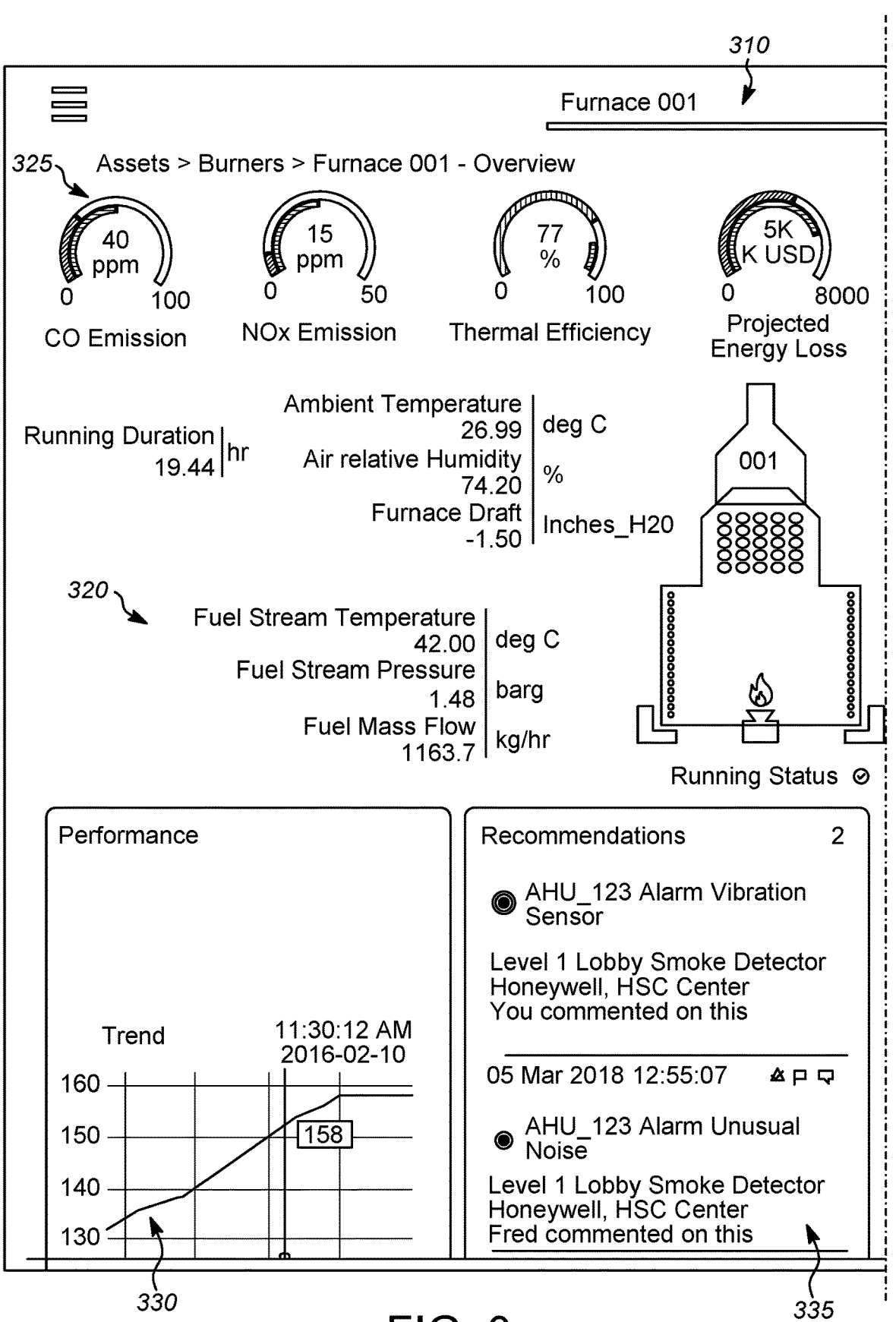

*310*

Furnace 001

*325* Assets > Burners > Furnace 001 - Overview 40 ppm
0          100
CO Emission 15 ppm
0          50
NOx Emission 77 %
0          100
Thermal Efficiency 5K K USD
0          8000
Projected Energy Loss Running Duration | hr
19.44

Ambient Temperature
26.99 | deg C
Air relative Humidity
74.20 | %
Furnace Draft
-1.50 | Inches_H20

001

*320*

Fuel Stream Temperature
42.00 | deg C
Fuel Stream Pressure
1.48 | barg
Fuel Mass Flow
1163.7 | kg/hr Running Status ⊘

Performance

Trend          11:30:12 AM
               2016-02-10
160
150          158
140
130

*330*

Recommendations          2

⊚ AHU_123 Alarm Vibration Sensor

Level 1 Lobby Smoke Detector
Honeywell, HSC Center
You commented on this

05 Mar 2018 12:55:07    ⚠ ⚑ 💬

⊚ AHU_123 Alarm Unusual Noise

Level 1 Lobby Smoke Detector
Honeywell, HSC Center
Fred commented on this

HUMAN MACHINE INTERFACE FOR PROVIDING INFORMATION TO AN OPERATOR OF AN INDUSTRIAL PRODUCTION FACILITY

CROSS-REFERENCE TO RELATED APPLICATION AND PRIORITY CLAIM

This application claims priority under 35 U.S.C. § 119 (e) to U.S. Provisional Patent Application No. 63/506,516 filed on Jun. 6, 2023. This provisional application is hereby incorporated by reference in its entirety.

TECHNICAL FIELD

This disclosure is generally directed to an industrial production facility controlled by an industrial process control and automation system. More specifically, it relates to a human machine interface (HMI) for providing information to an operator of the industrial production facility.

BACKGROUND

Industrial process control and automation systems are often used in industrial production facilities, or process plants to automate large and complex industrial processes. These types of control and automation systems routinely include sensors, actuators, and controllers. The controllers typically receive measurements from the sensors and generate control signals for the actuators. The industrial process control and automation systems are configured with control schemes using programmable logic controllers (PLC(s)), or in the case of more complex systems using distributed control systems (DCS) or supervisory control and data acquisition systems (SCADA). Automated process control relies on one or more process controllers that are communicatively coupled by input/output (I/O) modules coupled to one or more field devices that are coupled to processing equipment. The field devices comprise sensors for sensing parameters such as temperature and pressure, and actuators configured for receiving control signals generated by the process controllers that adjust settings of the processing equipment.

The operators of an industrial production facility are heavily dependent on a Human Machine Interface (HMI) to provide them with the ability to understand the past, current, and potential future state of the industrial process and the industrial process control and automation system managing the production facility in order to intervene when necessary to carry out operational procedures and address abnormal situations as they arise. Plant operators may utilize a set of standard operating procedures(s) (SOP) which describe methods for an operator's actions for operating the system and responding to situations. A key element of an HMI is ensuring that operators have access to the information they need when it is required. Doing so typically involves a significant upfront engineering activity in which the plant operator's information needs are analysed to design a collection of information displays and associated navigation mechanisms to address those needs. This is an expensive and time-consuming exercise resulting in a rigid structure that typically fails to account for day-to-day contingencies that influence the information that the operator needs.

SUMMARY

This disclosure relates to a human machine interface (HMI) for providing information to an operator of an industrial production facility.

In a first embodiment, a method is disclosed for a query-driven process operation that displays relevant information and data specific to an industrial process executing in an industrial production facility, the method comprises processing a request for information from an operator using a human machine interface (HMI) connected to the industrial process control and automation system controlling the industrial process. The also includes collecting from a semantic network information and data specific to the operator request, generating a visual layout for the information and data received from the semantic network and displaying by the HMI the received In a second embodiment, a system is disclosed used in an industrial process control and automation system controlling an industrial process, the system comprises an operator device connected to the industrial process control and automation system and to an input device that enters requests for information from the operator into the operator device. A display is connected to the operator device that displays information from the operator device to the operator. A human machine interface (HMI) on the operator device receives the requests for information from the operator. A semantic network is operatively connected to the industrial process control and automation system collects and stores information of semantic relationships between the assets and devices of the industrial process control and automation system. Responsive to the requests for information by the operator the HMI collects the requested information from the semantic network which is coupled to a layout engine that generates a visual layout for the information retrieved from the semantic network for display of the received information to the operator on the display.

In a third embodiment, a non-transitory computer readable medium containing instructions is disclosed that when executed by at least one processor device of an operator computer system controlled by a human machine interface (HMI) connected to an industrial process control and automation system controlling an industrial process causes the HMI to process a request for information from an operator. Collect information and data specific to the operator request from a semantic network that is communicatively connected to the industrial process control and automation system and the industrial process. Generate a visual layout for the information and data received from the semantic network and display using the visual layout the information and data received from the semantic network on the operator computer system.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
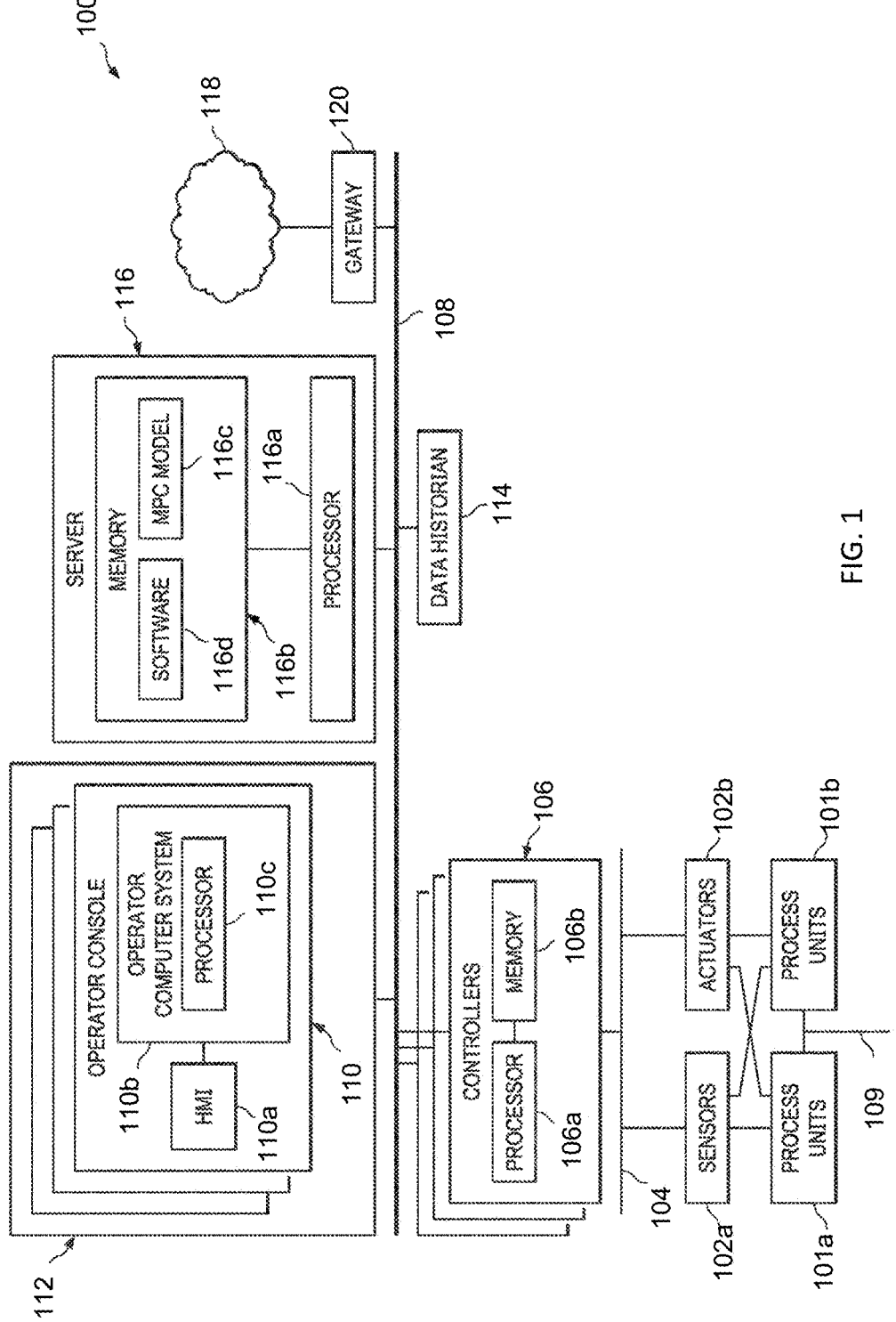
FIG. 1 illustrates an example industrial process control and automation system used to control an industrial production facility.

The figures discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

The systems and methods of the present disclosure are concerned with providing information to a plant operator using a human machine interface (HMI) that can display the most relevant information specific to an industrial process executing in an industrial production facility based on the plant operator's current interest. The disclosed system and method avoids much of the effort required to engineer an HMI specific to the industrial process. Specifically, the system and method of the present disclosure allow a plant operator to declare an interest in information to the HMI in the form of search commands and queries. For example, the search command "Furnace001" would populate the HMI with information relevant to an asset of the production facility labeled "Furnace001", including schematics of the asset, and current operating data from various devices and systems managing and executing the industrial process. The information would be displayed on an operator console or other display device to the plant operator.

A query is input to the HMI by the plant operator in the form of natural language as either text messages or by voice in the form of speech. A query may also be made descriptive expressing what the plant operator is interested in. For example, the plant operator may issue a voice query to the HMI to, "show me information related to the trip of Furnace001". In this example, the HMI would collect information relating to the unplanned shutdown of Furnace001, including alarm information, process trends leading up to the trip, equipment health data, etc. for display to the plant operator.

The information collected and shown by the HMI to the plant operator can be further influenced by any current operational context. The operational context may include the current process mode of the plant. For example, if the plant is in a start-up state, a steady state, or experiencing an abnormal situation, etc. The operational context may include the current state of the process managed by an industrial process control and automation system, such as for example, current process parameters for the process being run and any parameters that have sent alarms. Other operational context may include the health of plant equipment and any current or planned operational maintenance that is scheduled to be performed, the execution of Standard Operating procedures (SOPs), and the execution of specific tasks such as a shift handover, e.g., presenting a summary of the shift performance and outstanding issues to the plant operator assuming the shift. Other operational context may include operating risk factors, such as operations of the industrial process using a new set of parameters, atypical feedstocks, hot maintenance activities, adverse weather conditions, etc. Another operational risk factor may include the state of any advanced control system or plant wide optimization system that may impact a particular set of constraints that the plant operator needs to monitor for a manual intervention.

The factors described above establish the operational context in which the plant operator receives information from the HMI. For example, if Furnace001 is currently being started up, an operator query for information for Furnace001, would include the start-up procedure and process parameters required to monitor the start up. Conversely, if Furnace001 is running in a steady state, then the start-up procedure would not be shown. Instead, parameters required to monitor steady state would be shown, and any information from any advanced control strategies that is managing the steady state.

It is recognized that although basic context-based guidance for plant operators may be known, disclosed aspects of the present disclosure go further by making the HMI responsive to context-based guidance, including being responsive to the operator queries inputs within context-sensitive operational inputs that allows the HMI to display specific plant information to the plant operator and thereby, automate the interaction of the plant operator with the HMI. This disclosed aspect makes the HMI more efficient and also allows the operator to better concentrate on those actions that have a direct impact on the industrial process of the industrial production facility.

FIG. 1 illustrates an example industrial process control and automation system 100 that can benefit from disclosed aspects of the present disclosure. As shown in FIG. 1, the system 100 includes various components that facilitate production or processing of at least one tangible product or other tangible material. For instance, the system 100 can be used to facilitate control over components in one or multiple industrial production plants. Each industrial production plant represents one or more processing facilities (or one or more portions thereof), such as one or more manufacturing facilities for producing at least one tangible product or other tangible material. In general, each plant may implement one or more industrial processes, and can individually or collectively be referred to as being a processing system. A processing system generally represents any system or portion thereof configured to process one or more products or other tangible materials in some manner. The system 100 includes field devices comprising one or more sensors 102a and one or more actuators 102b that are coupled between the controllers 106 and the processing equipment, shown in simplified form as process unit 101a coupled by piping 109 to another process unit 201b. The sensors 102a and actuators 202b represent components in a process system that may perform any of a wide variety of functions. For example, the sensors 102a can measure a wide variety of characteristics in the processing system, such as flow, pressure, or temperature. Also, the actuators 102b can alter a wide variety of characteristics in the processing system, such as valve openings. Each of the sensors 102a includes any suitable structure for measuring one or more characteristics in a process system. Each of the actuators 102b includes any suitable structure for operating on or affecting one or more conditions in system 100.

At least one network 104 is shown providing a connection between the controllers 106 and the sensors 102a and actuators 102b. The network 104 facilitates interaction with the sensors 102a and actuators 102b. For example, the network 104 can transport measurement data from the sensors 102a to the controllers 106 and provide control signals from the controllers 106 to the actuators 102b. The network 104 can represent any suitable network or combination of networks. As particular examples, the network 104 can represent at least one Ethernet network (such as one supporting a FOUNDATION FIELDBUS protocol), electrical signal network (e.g., a Highway Addressable Remote Transducer (HART protocol network)), pneumatic control signal network, or any other or additional type(s) of network(s).

The system 100 also comprises various process controllers 106 generally configured in multiple Purdue model levels that may be present at all levels besides level 0, where level 0 generally only includes the field devices (sensors and actuators) and the process units. Each process controller comprises a processor 106a coupled to a memory 106b. The process controllers 206 can be used in the system 200 to perform various functions in order to control one or more industrial processes.

For example, a first set of process controllers 206 corresponding to level 1 in the Purdue model may refer to smart transmitters or smart flow controllers, where the control logic is embedded in these controller devices. Level 2 generally refers to a distributed control system (DCS) controller, such as the C300 controller from Honeywell International. These level 2 controllers can also include more advanced strategies including machine level control built into the C300 controller, or another similar controller. Level 3 is generally reserved for controllers implemented by the server 116. These controllers interact with the other level (1, 2 and 4) controllers.

The level 1 controllers in the case of smart devices, or level 2 controllers such as the C300 controller, may use measurements from one or more sensors 102a to control the operation of one or more actuators 102b. The level 2 process controllers 106 can be used to optimize the control logic or other operations performed by the level 1 process controllers. For example, the machine-level controllers, such as DCS controllers, at Purdue level 2 can log information collected or generated by process controllers 106 that are on level 1, such as measurement data from the sensors 102a or control signals for the actuators 102b.

A third set of controllers implemented by the server 116 corresponding to level 3 in the Purdue model, known as unit-level controllers which generally perform model predictive control (MPC), can be used to perform additional functions. The process controllers 106 and controllers implemented by the server 116 can collectively therefore support a combination of approaches, such as regulatory control, advanced regulatory control, supervisory control, and advanced process control. In one arrangement, the third set of controllers implemented by the server 116 comprises an upper-tier controller corresponding to level 4 in the Purdue model, which generally also performs MPC control, also known as a plant-level controller, coupled to a lower-tier controller corresponding to level 3 in the Purdue model. The server 116 processor 116 a can comprise a digital signal processor (DSP), a microcontroller, an application specific integrated circuit (ASIC), a general processor, or any other combination of one or more integrated processing devices.

An MPC simulation model generally resides in a memory (shown as an MPC model 116c stored in memory 116b as shown in FIG. 1) associated with the upper-tier controller implemented by the server 116, wherein the upper-tier controller uses the MPC simulation model to predict movements in the process, participates in controlling the plant, and interacting with the MPC simulation model to optimize overall economics of the plant including sending an output from the MPC simulation model as setpoint targets to the lower-tier controller. The lower-tier controller uses the setpoint targets for diverting the raw material or the intermediate material in the piping network.

At least one of the process controllers 106 shown in FIG. 1 can denote a model-based process controller that operates using one or more process models. For example, each of these process controllers 106 can operate using one or more process models, including an MPC simulation model, to determine, based on measurements from one or more sensors 102a, how to adjust one or more actuators 102b. In some disclosed aspects, each model associates one or more manipulated variables (MVs) or disturbance variables (DVs) often referred to as independent variables, with one or more control variables (CVs) often referred to as dependent variables. Each of these process controllers 106 could use an objective function to identify how to adjust its manipulated variables in order to push its CVs to the most attractive set of constraints.

At least one network 108 couples the process controllers 106 and other devices in the system 100. The network 108 facilitates the transport of information between components of the system 100. The network 108 can represent any suitable network or combination of networks. As particular examples, the network 108 can represent at least one Ethernet network.

Plant operator access to and interaction with the process controllers 106 and other components of the system 100 including the server 116 can occur via various disclosed operator consoles 110 which comprise an HMI 110 a coupled to an operator computer system 110b that includes a processor 110c. Each operator console 110 can be used to provide information to a plant operator and receive information from the plant operator. For example, each operator console 110 can provide information identifying a current state of an industrial process to the plant operator, such as values of various process variables and warnings, alarms, or other states associated with the industrial process.

Each operator console 110 can also receive information affecting how the industrial process is controlled, such as by receiving setpoints or control modes for process variables controlled by the process controllers 106 or process controller implemented by the server 116, or other information that alters or affects how the process controllers control the industrial process. Each operator console 110 includes any suitable structure for displaying information to and interacting with an operator. For example, the operator computing device can run a WINDOWS operating system or other operating system.

Multiple operator consoles 110 can be grouped together and used in one or more control rooms 112. Each control room 112 could include any number of operator consoles 110 in any suitable arrangement. In some disclosed aspects, multiple control rooms 112 can be used to control an industrial plant, such as when each control room 112 contains operator consoles 110 used to manage a discrete part of the industrial facility.

The system 200 generally includes at least one data historian 114 that generally includes event logs that are entered by operators or technicians. The data historian 114 may also store various information about the system 100. The data historian 114 can, for instance, store information that is generated by the various process controllers 106 during the control of one or more industrial processes, as well as event logs. The data historian 114 includes any suitable structure for storing and facilitating retrieval of the information it stores. Although shown as a single component here, the data historian 114 can be located elsewhere in the system 100, such as in the cloud, or multiple data historians can be distributed in different locations in the system 100.

The server's 116 processor 116a executes applications for users of the operator consoles 110 or other applications. The applications can be used to support various functions for the operator consoles 110, the process controllers 106, or other components of the system 100. Each server 116 can represent a computing device running a WINDOWS operating system or other operating system. Note that while shown as being local within the system 100 the functionality of the server 116 can be remote from the system 100. For instance, the functionality of the server 116 can be implemented in a computing cloud 218, or in a remote server communicatively coupled to the system 100 via a gateway 120.

Although FIG. 1 illustrates one example of an industrial process control and automation system 100, various changes may be made to the system 100. For example, the system 100 can include any number of sensors, actuators, controllers, networks, operator consoles, control rooms, data historians, servers, and other components.

In the present system and method, the operator console 110 includes an HMI 110 a that acts as the interface for a query-driven and context-sensitive process operation that can display the most relevant information specific to an industrial process executing in an industrial production facility based on a plant operator's current interest. The information displayed on operator console 110 is responsive to a plant operator's specific query made to the HMI 110a. The information collected by the HMI 110a and displayed to the plant operator's particular query includes information within the current operational context of the industrial process controlled by the system 100. For example, when an operator computer system 110b associated with the HMI 110a detects an alarm the operator can use a natural language instruction to the HMI 110a to request information relating to the alarm. The system and method would collect information stored in the data historian 114, controllers 106 and process units 101a and 101b of system 100 focused on the abnormal situation that caused the alarm. Additionally, the HMI 110 a would present to the plant operator either on the operator's console 110 or a portable display device (not shown) suggested actions that may be used to implement corrective actions in the system 100 responsive to the alarm.

Knowledge of how to respond to a variety of particular current situations including abnormal situations such as alarms, or routine maintenance that is scheduled to be due, may be captured in SOPs or other procedural instructions. However, SOPs are typically expensive and difficult to establish and maintain over time. An alternative approach is to use the history of operations for the process control system, generally stored in a data historian as a source of knowledge of how to respond to a plurality of current situations. The operational history can be stored at the site of the system 100, as situation/event data, or can be stored at a plurality of different sites that generally all implement the same system in the same industrial process. For example, operator generated event logs that are generally stored in a data historian can be 'mined' for prior examples of the same or a highly current situation and an analysis of the actions that were previously taken to respond to that current situation and the results of the action can be used to derive suggestions for a plant operator on what actions might be appropriate for action responsive to the current situation.

Deriving suggestions based on the history of operations of the system 100 stored in a data historian 114 including event logs can be accomplished by applying analytical techniques to the event logs produced by operators at operator console 110 over a sufficiently long period of time. For example, analytical techniques such as sequence mining and deep learning techniques (sequence-to-sequence networks, and convolutional networks), can be used to provide suggestions for upcoming (current) operator actions. These suggestions are based on the current state of the system 100 and the sequence of events leading up to the point in time that the current situation occurs.

Figure 2:
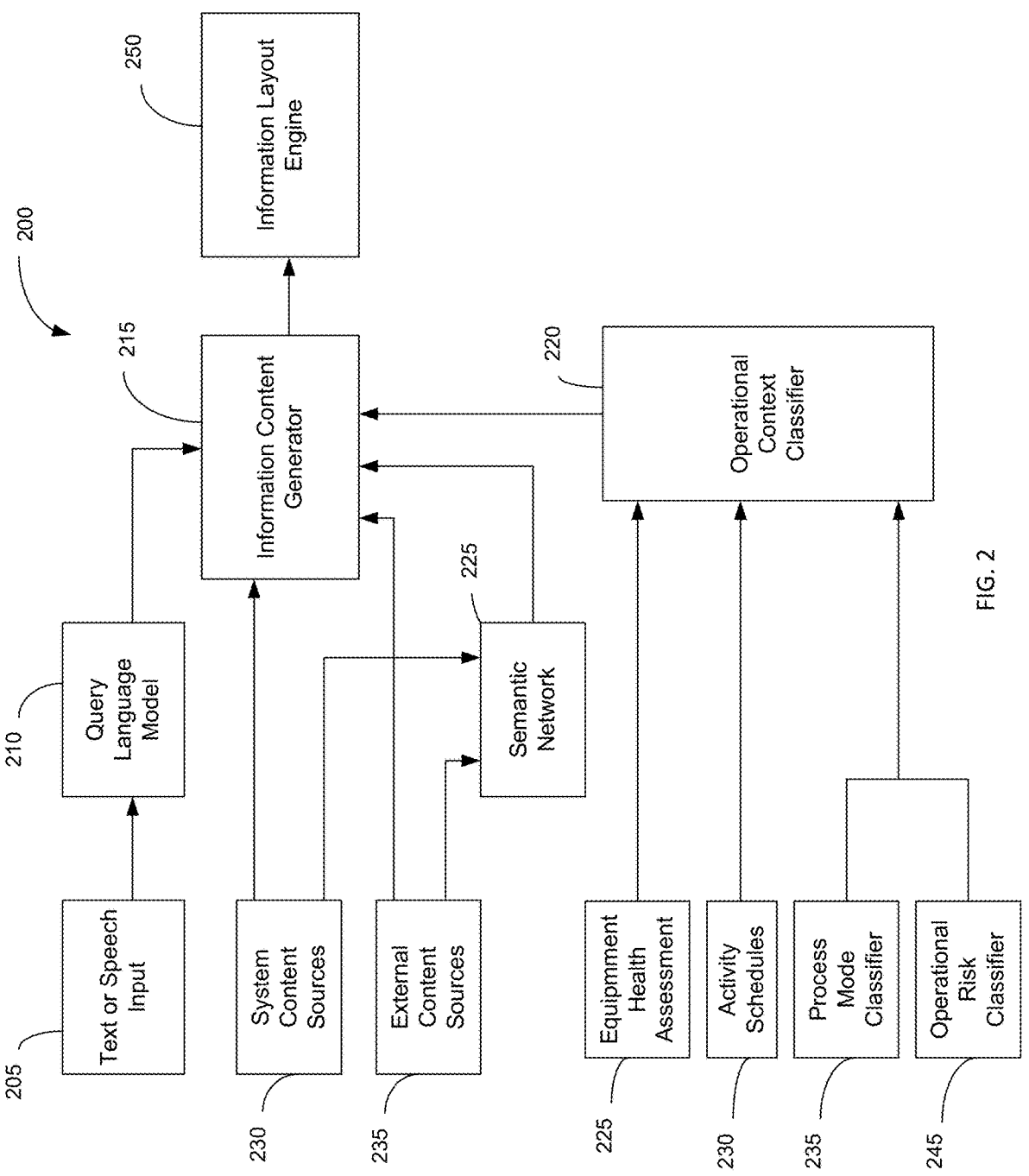
FIG. 2 illustrates an example HMI for providing information to an operator of an industrial production facility, according to this disclosure.

FIG. 2 illustrates a query-driven and context-sensitive process 200 for providing information to a plant operator of an industrial production facility. The method 200 described herein and illustrated in FIG. 2 is performed by HMI 110a in conjunction with the operator console 110 of FIG. 1. Alternately, the process operations of FIG. 2 may be a non-transitory medium executing as individual software applications contained in the memory 116d of server 116 and executed by processor 116a. It should be noted that each process operation shown in FIG. 2 may be a software algorithm, an executable application, or function module executing individually or concurrently to provide the information requested by the plant operator to HMI 110a.

Process operation 205, enters a natural language query prompt to the HMI 110 by the plant operator using an input device such as for example a keyboard (not shown) associated with the operator console 110 for textual input or a microphone (not shown) for audio or speech input.

A query language model 210 accepts the query prompt input in process operation 205 from the plant operator and passes a text query to the information content generator 215. In the case of a voice query from the operator, the query language model 210 would convert the voice utterance to text. In the case of a direct key board text query, the text query prompt is passed through to the information content generator 215. The query prompt may also be translated into the system's 100 local language to allow for multilingual queries. The query language model 210 may be any currently known software application for generating a natural language query consisting of terms or phrases spoken normally or entered as they might be spoken, without any non-language characters and without any special format or alteration of syntax. Alternately, a neural network generative (artificial intelligence) AI language model may be used as the query language model 210.

The operator query prompt from the query language model 210 is next input to an information content generator 215. The information content generator 215 receives the query prompt from query language model 210 and uses the query prompt to receive information and data relating to the query prompt from the semantic network 225.

The semantic network 225 is continually updated with data and meta-data from the system content sources 230 and external content sources 235. The semantic network 225 parses the received information and data from the content sources 230 and 235 and identifies content and content based meta-data to build semantic relationships with the data from the content sources. The semantic network 225 stores the semantic relationships between the elements such as for example, the asset devices and operations of system 100. Querying the semantic network 225 provides information and data as well as linkages to the relationship of the elements of system 100 and how the elements of the system 100 are related. For example, a query from the information content generator 215 for information for an asset labelled Furnace001, would provide performance information for the asset including a list of things related to Furnace001 together with links to any associated content sources. For an operator query prompt, "How do I avoid a compressor trip on loss of feed?", the semantic network 225 would identify the SOP for stabilizing the compressor on loss of feed as one of the related items. The information content generator 215 can then use the link provided to go and access the SOP so it can be presented to the operator. The semantic network 225 may be implemented using a semantic database, a knowledge graph, deep learning neural network, or a vector embedding model, that can derive information and data from system 100 provided by content crawlers.

The systems content sources 230 collects information and data pertaining to the system 100 from logs, asset lists, process modules, and controllers of the industrial process control and automation system 100 that is input to the semantic network 225. The system content source 230 information and data may include, asset model entities, process parameter data from databases or from historians both current and historical, activity and event logs, control strategies that control plant machinery or actuators, graphic displays, trends, calculations, faults, recommendations, shift logs, incident reports, SOPs, and key performance indicators (KPI).

The external content sources 235 collects information and data from external sources. External sources may be information and data collected from systems outside of the system 100. Such as for example, weather data, including temperature, wind speed, humidity for the location of the industrial production facility. The weather data may be supplied via gateway 120 from the cloud 118. The information content generator 215 may also use the process content from the content sources 230, 235 prior to displaying the information and data to the operator, which will be explained in detail later in the examples.

An operational context classifier process 220 is used by the process 200 to provide operational context when querying the semantic network 225. The information content generator 215 asks the operational context classifier 220 what the current, or previous operational context is. For example, operational context may include process state (process upset, e.g., loss of feed), current or planned maintenance activities, known equipment health issues, etc. The information content generator 215 then adds this information to the query sent to the semantic network 225, requesting information that is framed within the requested operational context. The added context influences the list of related information and data returned from the semantic network 225 to information content generator 215. For example, the fact that there is a severe weather warning may make additional SOPs relevant.

The operational context classifier 220 collects current and past context-sensitive information applicable to the plant. The information content generator 215 uses the information to secure from the semantic network 225 data that is context-sensitive from the system 100. The operational context classifier 220 receives information of the current process mode from the process mode classifier 235, scheduled production schedules and maintenance activities from activity schedules process 230, equipment health assessment, from the equipment health assessment process 225 and current operational risk from operational risk classifier 245.

The process mode classifier 235 identifies the current process mode for the industrial process controlled by system 100 including if the process is in a steady state, in a start up state, in a shut down state, a transition state, process upset, etc.

The equipment health assessment 225, identifies the equipment health status of a production asset, if it for example, healthy, failed, or degraded. The information could also come from an external third-party system, such as an asset performance monitoring solution that operates in conjunction with system 100.

The activity schedules 230 collects the status of current and planned activity and maintenance that may be performed on the assets of the industrial production facility or system 100.

The operational risk classifier 245 identifies potential risks to the operations of the industrial plant arising from adverse weather and maintenance activities that are to be, or are being performed on a live production facility, including for example cleaning heat exchangers, replacing valves, calibrating sensors, working on the flare systems, etc. Other operational risks that may be identified by the operational risk classifier 245 may include degraded control, such as when control loops are saturated, or when the industrial production facility is operating in a new mode.

The semantic relationships between the items of information and data secured by semantic network 225 and context-sensitive information from the operational context classifier 220 is sent to the information content generator 215 where the information and data is converted into a form for use in the visual layouts produced by the information layout engine 250.

The information layout engine of process operation 250 automatically generates a visual layout of the information items collected by the information content generator 215 for display on operator console 110 or on a portable display device (not shown). The information content generator 215 uses a responsive design to create layouts appropriate to the device on which the HMI 110a is displayed, such as for example, the control room operator console 110, or a mobile device such as a smart phone, or a tablet device. The information layout engine 250 may support one or more graphic design approaches, such as for example abnormal situation management (ASM) compliant and configurable library of web shape objects. The information layout engine 250 may be implemented using a template-based approach wherein pre-developed templates are loaded into information layout engine 250 and used to display information to a particular selected display device. Or preferably, the engine 250 may use generative AI producing HTML source code that produces and generates an HMI display layout based on the description of the information to be displayed and relevant design guidelines and constraints. The information layout engine 250 may also produce source code in other languages that could be used to implement the displayed HMI.

EXAMPLES

Disclosed aspects are further illustrated by the following specific examples, which should not be construed as limiting the scope or content of this disclosure in any way.

As described above, although the basic provisions of a query-driven, HMI may be known, disclosed aspects of the present disclosure go further by making the HMI and its process operations illustrated FIG. 2 a query-driven and context-sensitive process that can display the most relevant information specific to an industrial process executing in an industrial production facility based on the plant operator's current interest.

Figure 3:
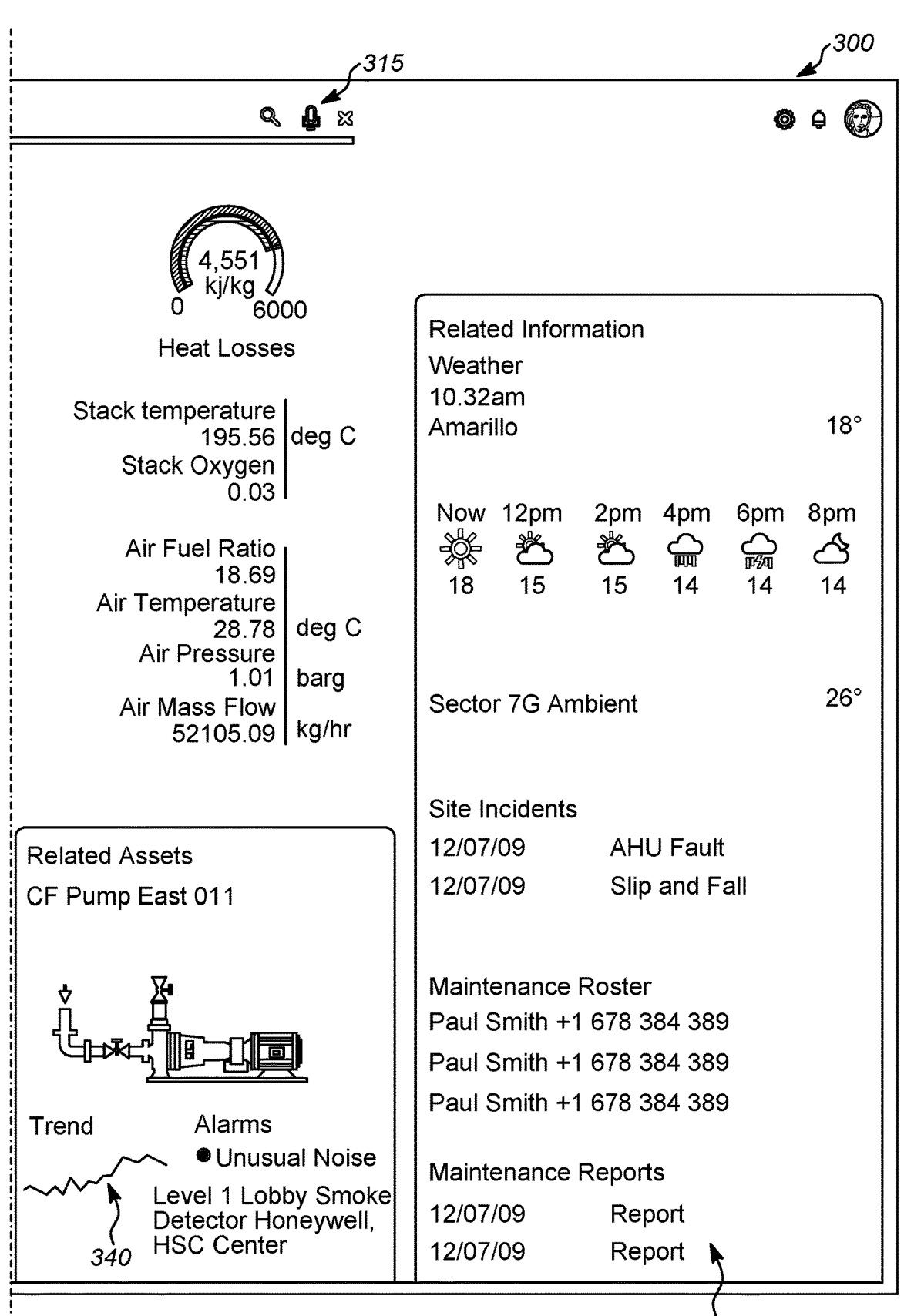
FIG. 3 illustrates example screen layout produced by the HMI of FIG. 2, according to this disclosure.
Figure 4:
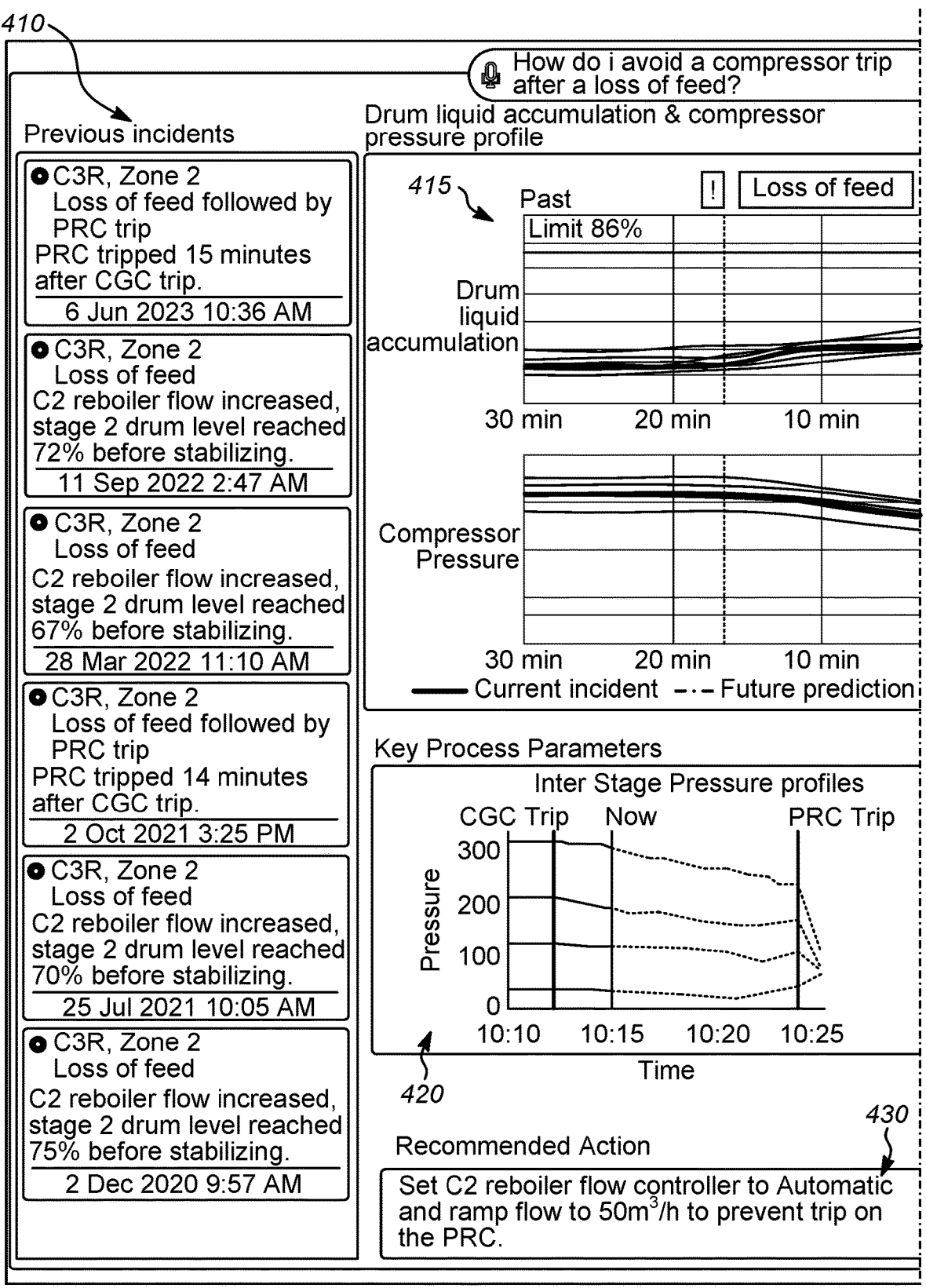
FIG. 4 illustrates another example screen layout produced by the HMI of FIG. 2, according to this disclosure.
Figure 4:
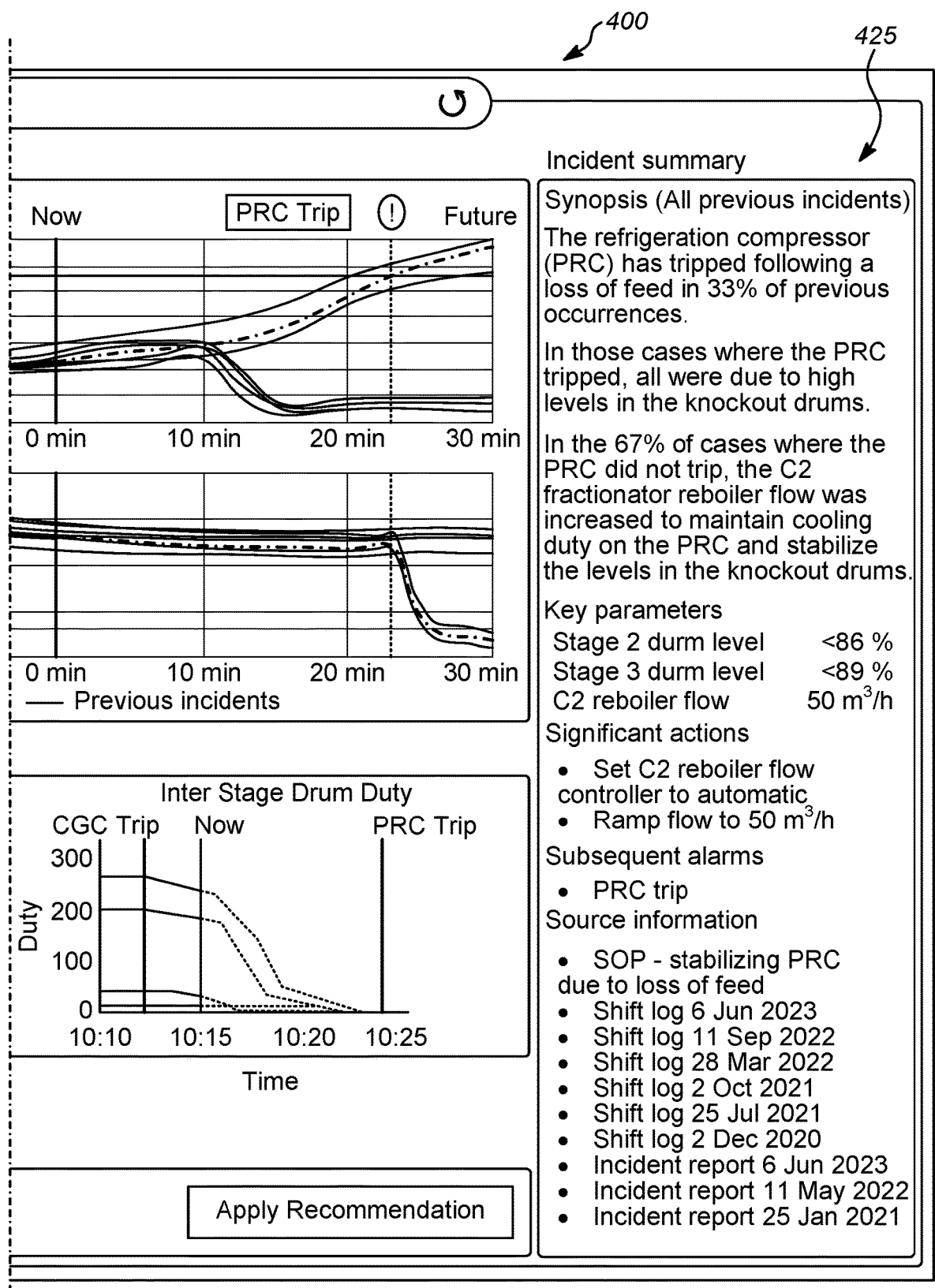

FIG. 3 and FIG. 4 each show depictions of example screenshot displays resulting from a query to the query-driven and context-sensitive process 200 of the present disclosure. In FIG. 3, a screen 300 illustrates the information and screen layout in response to a query to provide information for a furnace asset running in the industrial production facility. In FIG. 4, a screen 400 illustrates the information and screen layout for a query prompt by the plant operator on how a compressor trip can be avoided after a loss of feed.

With reference to FIG. 3, an example screen layout 300 is generated by process 200 in response to a simple operator search query for "Furnace001". The search text "Furnace001" was entered in the search field 310 at the top of the screen. The microphone icon 315 enables the plant operator to make a query using speech by selecting the icon and using his voice. The HMI 110a using the process 200 of FIG. 2, generates the screen layout for display at an operator console 110 or at a mobile device as a result of the operator query 310.

The screen 300 includes a graphic representation of the selected furnace including its running status 320 and includes alpha-numeric displays of key current operational parameters located surrounding the graphic of the furnace. Representations of current KPIs 325 for the furnace are illustrated by the graphics along the top of the screen shown above the furnace graphic 320.

In the lower left corner of the screen 300 a trend graph 330 of furnace's performance is illustrated. Next to the trend graph current recommendations 335 may be listed relating to the queried furnace. The recommendations may include maintenance items that need to be addressed by maintenance personnel such as, for example, vibration noises or alarms. Related assets 340 may be displayed providing information to the status, such as the condition and performance of related devices required by the furnace to operate efficiently. In the example of 340, a pump is illustrated with a trend line and any alarms that may have been made during its operation. Finally, the screen 300 may further include other related information 345 including weather, site safety incidents, maintenance contacts, and maintenance reports.

FIG. 4 illustrates the screen layout generated by process 200 in response to a natural language query made by the plant operator on "how do I avoid a compressor trip after a loss of feed?" Process 200 generates screen layout 400 as the result of the operator's query. The screen layout 400 includes a list of previous loss of feed incidents 410 and graphs of trends 415 and key process parameters 420 for drum liquid accumulation and a compressor pressure profile that include current, as well as historical data for the compressor. On the right side of screen 400 an incident summary 425 lists information from SOPs, shift logs, and incident reports from previous loss of feed incidents provided by the content sources 230, 235 made by the information content generator 215 before display to the operator. A recommended action is provided to the plant operator in box 430 in response to his query that can be made to prevent a compressor trip after a loss of feed.

It may be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," or "controller" within a claim is understood and intended to refer to structures known to those skilled in the relevant art, as further modified or enhanced by the features of the claims themselves and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for a query-driven process operation that displays relevant information and data specific to an industrial process executing in an industrial production facility, the method comprising:

processing a request for information from an operator using a human machine interface (HMI) connected to the industrial process control and automation system controlling the industrial process;

collecting from a semantic network information and data specific to the operator request;

generating a visual layout for the information and data received from the semantic network; and displaying by the HMI the received information and data to the operator using the visual layout;

wherein the semantic network:

collects system content information and data from the industrial process control and automation system controlling and the industrial process; and collects external content information and data from external sources not associated with the assets of the industrial process, wherein the semantic network builds semantic relationships with the collected system content information and data and external content information and data.

2. The method of claim 1, wherein the request for information from the operator is sent to an information content generator that retrieves from the semantic network the semantic relationship information for the industrial process specific to the operator request.

3. The method of claim 2, wherein the method further includes a context-sensitive process operation arranged to collect context-sensitive process operation information and data from the industrial process of the industrial production facility wherein the context-sensitive process operation information and data is used to request semantic network information and data specific to the operator request that includes operational context.

4. The method of claim 3, wherein the step of generating a visual layout for the information and data received from the semantic network includes using the operational context from the context-sensitive process operation to develop the visual layout.

5. The method of claim 4, wherein the HMI includes an information layout engine that receives the visual layout and displays the information and data specific to the operator request to the operator at an operator console.

6. The method of claim 1, wherein the request for information from the operator to the HMI may be entered using a natural language query as a text from a keyboard or a speech query from a microphone, wherein a query language model converts the speech query to text.

7. A system used in an industrial process control and automation system that controls an industrial process executing in an industrial production facility, the system comprising:
   an operator device connected to the industrial process control and automation system;
   an input device for entering requests for information from an operator into the operator device;
   a display for displaying information from the operator device to the operator;
   a human machine interface (HMI) operating on the operator device that receives the requests for information from the input device;
   a semantic network connected to the industrial process control and automation system that collects information of semantic relationships between assets and devices of the industrial process control and automation system; and
   an information layout engine for generating a visual layout of the information received from the semantic network,
   wherein responsive to the requests for information by the operator the HMI collects the requested information from the semantic network and displays the received information to the operator on the display using the visual layout;
   wherein the semantic network comprises:
   a systems content source communicatively coupled to the industrial process control and automation system that collects system content information and data from the industrial process control and automation system and the industrial process; and
   an external content source communicatively coupled to external content sources that collects external content information and data from external sources not associated with the assets of the industrial process, wherein the semantic network builds the semantic relationships with the information and data collected from the system content source and the external content source.

8. The system of claim 7, wherein the request for information from the operator is a natural language query prompt sent to an information content generator, wherein the information content generator retrieves from the semantic network the semantic relationship information for the industrial process.

9. The system of claim 8, wherein the system further includes an operational context classifier communicatively coupled to the information content generator, the operational context classifier receiving context-sensitive process operation information and data from the industrial process of the industrial production facility wherein the context-sensitive process operation information and data is used by the information content generator to request semantic relationship information specific to the operator request that includes operational context.

10. The system of claim 9, wherein the semantic relationship information and context-sensitive process operation information and data received by the information content generator are converted into a visual form by the information content generator and output to the information layout engine for use in the visual layouts generated by the information layout engine.

11. The system of claim 9 wherein the context-sensitive process operation information and data is displayed to the operator on the display using the visual layout.

12. The system of claim 8, wherein the request for information from the operator to the HMI may be entered using a natural language query as text from a keyboard.

13. The system of claim 12, wherein the request for information from the operator to the HMI may be entered as a speech query from a microphone and communicatively coupled to a query language model that converts the speech query to text that is input to the information content generator.

14. A non-transitory computer readable medium containing instructions that when executed by at least one processor device of an operator computer system controlled by a human machine interface (HMI) connected to an industrial process control and automation system controlling an industrial process causes the HMI to:
   process a request for information from an operator;
   collect information and data specific to the operator request from a semantic network that is communicatively connected to the industrial process control and automation system and the industrial process;
   generate a visual layout for the information and data received from the semantic network; and
   display using the visual layout the information and data received from the semantic network on the operator computer system;
   wherein the semantic network:
   collects system content information and data from the industrial process control and automation system and the industrial process; and
   collects external content information and data from external sources not associated with the assets of the industrial process,
   wherein the semantic network builds semantic relationships with the collected system content information and data and external content information and data.

15. The non-transitory computer readable medium of claim 14, wherein the processing by the HMI for information from an operator includes: sending the request for information to a content generator that retrieves from the semantic network semantic relationship information for the industrial process specific to the operator request.

16. The non-transitory computer readable medium of claim 15, wherein the instructions, when executed by the at least one processing device, further cause the HMI to:
   collect context-sensitive process operation information and data from the industrial process of the industrial production facility,
   wherein the context-sensitive process operation information and data is used to request semantic relationship information specific to the operator request that includes operational context.

17. The non-transitory computer readable medium of claim 16, wherein the instructions, when executed by the at least one processing device, further cause the HMI to:

include the context-sensitive process operation informa-
tion and data to generate the visual layout.

* * * * *